United States Patent
Flament et al.

(10) Patent No.: US 6,898,548 B2
(45) Date of Patent: May 24, 2005

(54) METHOD AND DEVICE FOR DETERMINING THE POSITION OR ORIENTATION OF AN OBJECT

(75) Inventors: Bruno Flament, Julten de Rate (FR); Benoit Dolbeau, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/220,998
(22) PCT Filed: Mar. 6, 2001
(86) PCT No.: PCT/FR01/00655
§ 371 (c)(1),
(2), (4) Date: Jan. 29, 2003
(87) PCT Pub. No.: WO01/67034
PCT Pub. Date: Sep. 13, 2001

(65) Prior Publication Data
US 2003/0151401 A1 Aug. 14, 2003

(30) Foreign Application Priority Data
Mar. 7, 2000 (FR) .............................. 00 02899

(51) Int. Cl.$^7$ ................................. G01B 7/14
(52) U.S. Cl. ..................................... 702/150
(58) Field of Search ................. 702/150, 95, 152; 343/122; 370/18; 600/437, 424, 130; 378/91; 382/154; 324/326, 318; 336/84

(56) References Cited

U.S. PATENT DOCUMENTS 4,054,881 A * 10/1977 Raab .......................... 342/448
5,446,727 A 8/1995 Bruckert et al. .............. 370/18

FOREIGN PATENT DOCUMENTS

WO 96/05768 1/1995

* cited by examiner

Primary Examiner—John Barlow
Assistant Examiner—Tung S Lau
(74) Attorney, Agent, or Firm—Thelen Reid & Priest, LLP

(57) ABSTRACT

Method for determining the position or the orientation of an object using a magnetic field and corresponding device.

The fields produced by sources ($S_1$, $S_2$, $S_3$) are coded, for example, by pseudo-random binary sequences. In this way it is possible, in a sensor (20) fixed to the object, to distinguish the respective contributions of different sources. The position or the orientation of the object on which the sensor (20) is fixed can be deduced (40) from these contributions.

Applications in remote control, positioning, security, medicine, etc.

9 Claims, 2 Drawing Sheets

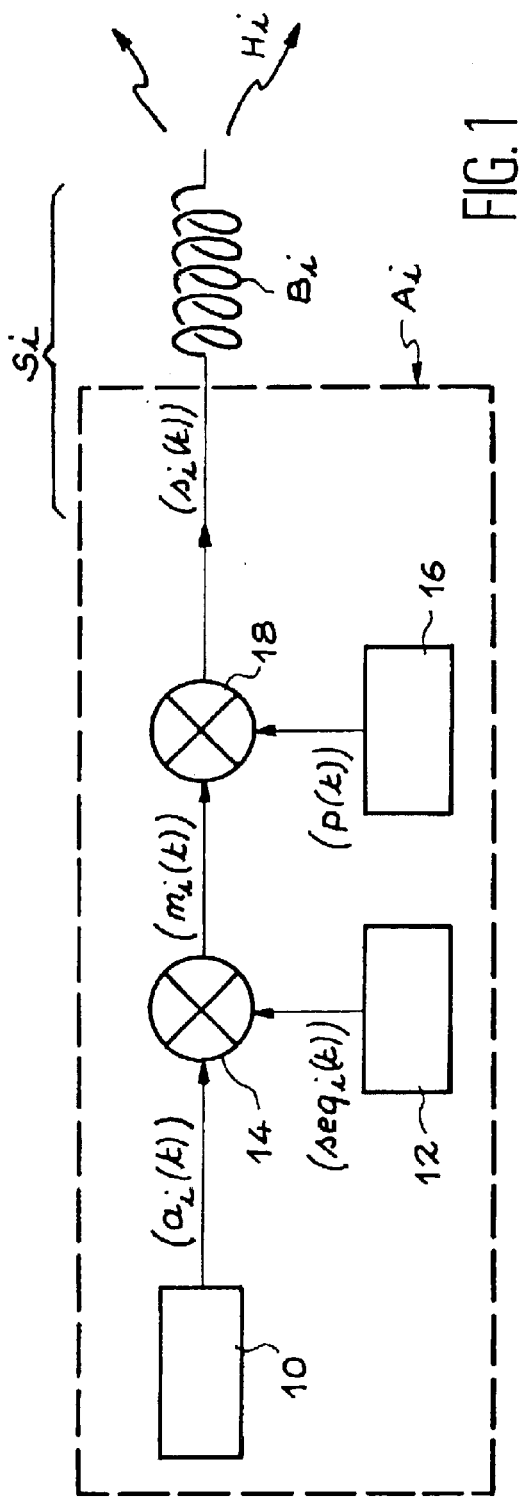
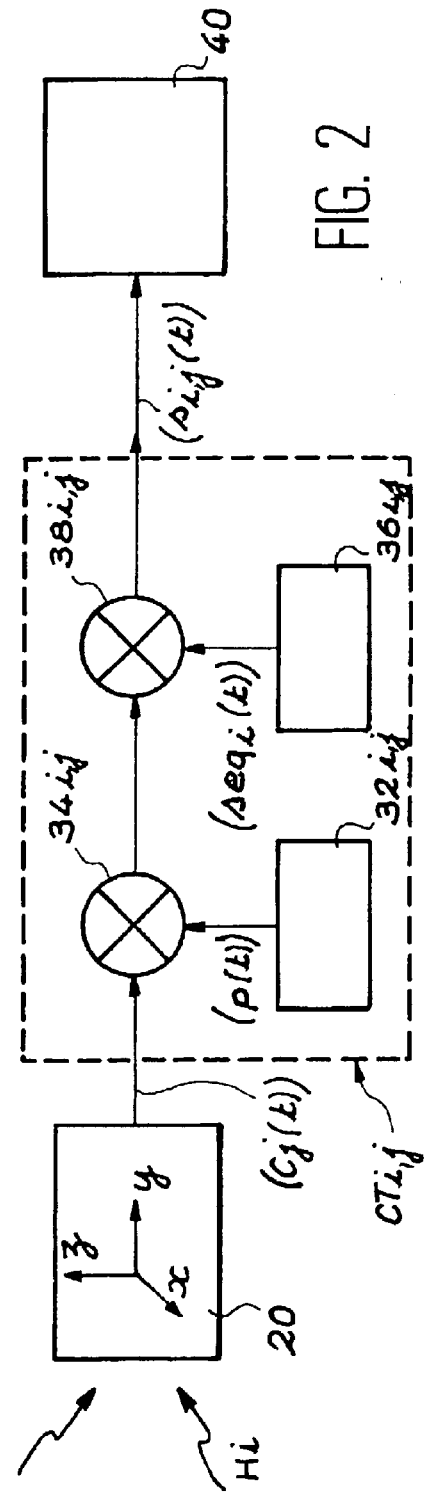
FIG. 1
FIG. 2

METHOD AND DEVICE FOR DETERMINING THE POSITION OR ORIENTATION OF AN OBJECT This application is a national phase of PCT/FR01/00655 which was filed on Mar. 6, 2001, and was not published in English.

TECHNICAL FIELD

The aim of the invention is a method for determining the position or the orientation of an object using a magnetic field and a corresponding device.

The sought after position may be an abscissa, an ordinate, a side, etc., and the orientation a pitch angle, a yaw angle, or a roll angle, etc. An object can be taken to mean a body, an apparatus, a device, a human or animal body, or even a point of a body, an apparatus, a device, a human or animal body, etc.

The invention has numerous applications. One may cite:

Industrial applications such as remote control, security, the positioning of apparatus, pinpointing, etc.

Multimedia applications requiring a remote control aimer.

Simulation applications (flight simulators, etc.).

Leisure applications, such as real time games requiring the capture of movements (head, hands, fingers, body, facial expression, accessories, etc.).

Applications in the production of computer synthesised images and editing video games, such as the animation of persons (capture of the movements of a human or animal or accessory), the capture of body deformation movements, the control in real time of a three dimensional environment.

Medical applications such as measuring the position of probes, endoscopes, catheters, etc., introduced into the human body, simulation of operations, navigation in anatomical structures.

Biomechanical applications involving an analysis of human or animal movements.

STATE OF THE PRIOR ART

Methods for determining the position or the orientation of an object using a magnetic field are already known. The document FR-A-2 586 302 describes, for example, a method in which the object is equipped with a magnetic dipole consisting of a coil excited by an ac generator. Moreover, assemblies for measuring in the space where the object is supposed to be situated are available, each assembly comprising directional magnetometers capable of measuring the component along an axis of the surrounding magnetic field. The components of the field along the axes is measured using these assemblies and, as a function of the result of these measurements, the co-ordinates of the origin of the dipole and the angles of orientation of the dipolar moment are calculated.

This set up can also be inverted by fixing the sensor onto the object and arranging the dipole in a fixed manner in the space.

This type of technique runs into a difficulty when several sources of magnetic filed have to be used to remove certain ambiguities. It is then necessary to be able to distinguish, in the overall measured field, the respective contributions of each source. Two techniques have been proposed to make this distinction:

In document U.S. Pat. No. 3,983,474, one proceeds by means of multiplexing, and only supplying power to one source at a time (or only one known combination of sources). This allows only the effect of the source supplied with power (or the combination of sources supplied with power) to be measured. By carrying out as many inputs of power as there are sources (or by carrying out as many independent combinations as there are sources), it is then possible to work back to the value of the magnetic field produced by each source. However, this method has the disadvantage of reducing the calculation frequency, because it is necessary to implement the supply sequence every time one wants to find out the position of the object. However, the greater the number of sources, the longer this sequence takes. As a result, the greater the number of sources, the weaker the acceptable pass band for temporal variation of the kinematic parameters.

In document WO/05 768, several different frequency canals are used. If N sources are used, one has to have available N free frequencies in the space where the method is implemented, which may be difficult in disturbed environments. Moreover, this multifrequency technique cannot, by definition, be employed in systems using a continuous field. In addition, this technique is very sensitive to interference by parasite sources operating on frequencies close to that of the system.

The aim of the present invention is precisely to overcome these disadvantages.

DESCRIPTION OF THE INVENTION

To this end, the invention advocates assigning an identity to each field source using a code that is imparted to the field. This code constitutes a sort of "signature" that makes it possible, in the sensor, to identify the origin of the field and thus to reconstruct the contributions of the different sources.

More precisely, the aim of the present invention is a method for determining the position or orientation of an object in space, in which:

in all of the space where the object is supposed to be situated, a magnetic field is produced using a plurality of N sources (where N is a whole number at least equal to 1), the object is equipped with a magnetic sensor, the signal delivered by the sensor is processed in order to determine the respective contributions of each of the N sources and the position or the orientation of the object is deduced from this, characterised in that:

the field produced by each source is coded using a code that is specific to this source, wherein the N different codes assigned to the N different sources are two by two orthogonal.

the N respective contributions of the N sources is obtained by decodings that correspond to the N codes used in the sources.

Magnetic sensor is taken to mean any suitable means for measuring one or several components of a magnetic field or its modulus. "Signal delivered" is taken to mean the signal (s) delivered by the sensor.

Preferably, the N codes used in the N sources are made up of N pseudo-random binary sequences two by two orthogonal, the decodings then being correlation operations. A pseudo-random binary sequence is made up of a series from 0 and 1 (or −1 and 1), this series not being periodic. Each element of this sequence has a duration $T_c$. The length $T_s$ of a sequence can be any figure but is predetermined. It is the same for all of the sources. The number of elements of the sequence is the quotient of $T_s$ by $T_c$.

The magnetic filed created may be the magnetic component of an electromagnetic field, in which case the sources are electromagnetic field sources.

A further aim of the present invention is a device for implementing this method. This device comprises means suited to carrying out operations defining the method.

In the preceding definitions of the invention, the conjunction "or", used in the expression "the position or the orientation", is inclusive, in other words it covers the case where one determines either the position of the object or its orientation, or both at the same time.

BRIEF DESCRIPTION OF THE DRAWINGS

FIG. 1 illustrates the production of a magnetic field that is coded by a pseudo-random identification sequence and which is modulated by a carrier.

FIG. 2 illustrates the corresponding demodulation and decoding processing.

DESCRIPTION OF EMBODIMENTS

Figure 3:
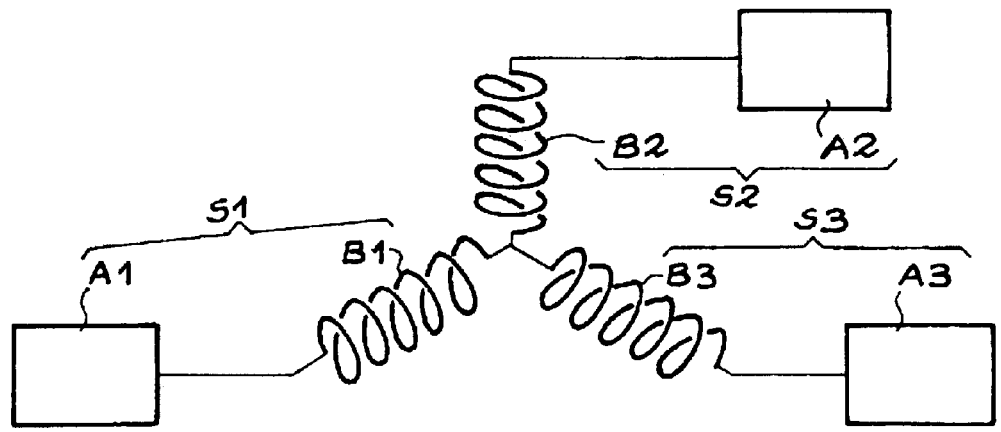
FIG. 3 shows, in a schematic manner, an installation using the method according to the invention.
Figure 3:
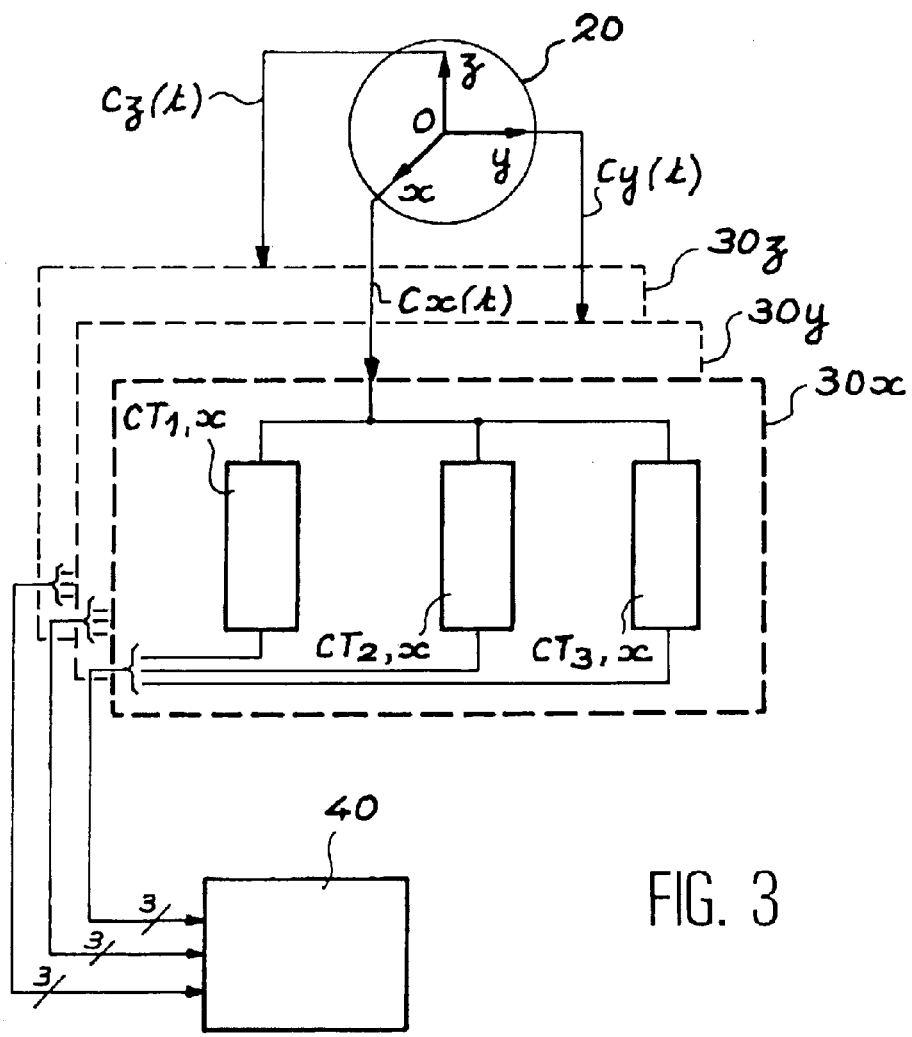

In the description that follows, one will consider codes made up of pseudo-random binary sequences. But the invention is not limited to this single case and covers all codes that could have, between them, a certain orthogonality in relation to a certain operation. In the case of pseudo-random sequences, this operation is correlation, an operation that is frequently encountered in signal processing.

FIG. 1 shows a source $S_i$ comprising a supply circuit $A_i$ and a coil $B_i$. The index i designates a range between 1 and N (included).

The circuit $A_i$ comprises a current generator 10, a pseudo-random sequence generator 12, a multiplier 14, a wave carrier generator 16 and a multiplier 18. The current produced by the generator 10 is noted $a_i$ (t) and the sequence $seq_i$ (t). The output of the multiplier is noted $m_i$ (t). One therefore obtains:

$$m_i(t) = a_i(t).seq_i(t)$$

The sequence $seq_i$ (t) is specific to each source. In order to be able to distinguish the sources from each other, one uses a family of sequences orthogonal two by two as per the correlation operation. If the binary sequence has a nearly-white spectral power density, the spectrum of the field produced by the source is then spread out around a central frequency (which may if necessary be zero). This technique is therefore like that of the spread spectrum.

The signal $m_i$ (t) thus obtained is then modulated in the circuit 18 by the carrier p (t) delivered by the generator 16 in order to give the final current $s_i$ (t):

$$s_i(t) = m_i(t).p(t)$$

The carrier p (t) is preferably the same for all of the sources. The current $s_i$ (t) supplies the coil $B_i$, which then produces a magnetic field $H_i$ coded by the sequence used.

The amplitude $a_i$ (t) of the current delivered by the generator 10 may be constant or slightly variable. In this latter case, one can control the intensity of the magnetic field in order to obtain an optimal signal—noise ratio. In this respect, one can use the technique described in the document WO 96/41119.

The sources $S_i$ constituted in this way (i ranging from 1 to N), are spread out in the space where the object to be located is supposed to be situated. They produce at each point of this space a magnetic field that is the sum of all of the fields $H_i$ produced at this point. This total field must be linked unequivocally to this point. The plurality of sources enables this result to be obtained and to remove any ambiguity.

FIG. 2 illustrates the means for measuring the field at a point and the processing carried out. These means comprise firstly a magnetic sensor 20 fixed on the object whose position or orientation one wishes to measure. This sensor receives all of the fields $H_i$ produced by the different sources. It may be directional, in other words sensitive to the magnetic field along M directions (for example the three directions defined by a trihedral trirectangle Oxyz). In principle, three directions are sufficient, but one could use more in order to obtain a certain redundancy. This sensor thus delivers M signals $C_j$ (t) where j designates a range (j ranging from 1 to M). The means represented then comprise processing circuits $CT_{i,j}$ each with a carrier generator $32_{i,j}$, a multiplier $34_{i,j}$, a pseudo-random sequence generator $36_{i,j}$ and a multiplier $38_{i,j}$. The generator $32_{i,j}$, generates a carrier p (t), which is used for the demodulation of the signal $C_j$ (t). The generator $36_{i,j}$, delivers a pseudo-random sequence $seq_i$ (t) corresponding to the sequence $seq_i$ (t) used in the source of range i. The multiplier $38_{i,j}$ decodes the signal and delivers a signal $s_{i,j}$ (t) corresponding to the source of the range i and the component j of the field measured by the sensor.

The MN signals demodulated and decoded $s_{i,j}$ (t) (i from 1 to N, j from 1 to M) are then applied to an estimation circuit 40, which gives the position or the orientation, or the position and the orientation, of the object.

FIG. 3 illustrates an embodiment where three field sources and a sensor measuring the three components of the field along three directions Ox, Oy, Oz are used. On thus has N=3 and M=3, i.e. 3 pseudo-random orthogonal sequences and 9 demodulation and decoding operations.

The assembly in FIG. 3 thus shows:

Three sources $S_1$, $S_2$, $S_3$, each composed of a source $A_1$, $A_2$, $A_3$ and a coil $B_1$, $B_2$, $B_3$.

A magnetic sensor 20, fixed to an object that is not shown, this sensor being directional and delivering three signals $C_x$ (t), $C_y$ (t) and $C_z$ (t) representing the three components of the overall magnetic field along three axes Ox, Oy and Oz.

Three processing circuits $30_x$, $30_y$, $30_z$, respectively receiving the signals $C_x$ (t), $C_y$ (t) and $C_z$ (t), each of these circuits comprising three circuits analogous to the circuit $CT_{i,j}$ illustrated in FIG. 2, namely $CT_{1,x}$, $CT_{2,x}$ and $CT_{3,x}$ which is the component along Ox (only the circuit $30_x$ is detailed in FIG. 3).

A circuit 40 using an algorithm for locating or determining the orientation (or both) of the object from the 3×3=9 signals that it receives.

In the previous description, the number of sources is equal to 3, but this lay out is in nowise limitative. One may, in certain cases, only use a single source, the code then acting to facilitate the detection of the field in a difficult ambient medium. The correlation will always be implemented and will make it possible to distinguish the useful field from parasite fields, which, without the coding—decoding, can disrupt the measurement.

What is claimed is:

1. Method for determining the position or the orientation of an object in space, in which:

in all of the space where the object is supposed to be situated, a magnetic field ($H_i$) is produced using a plurality of N sources ($S_i$) (where N is a whole number at least equal to 1), the object is equipped with a magnetic sensor (20), the signal ($C_i(t)$) delivered by the sensor (20) is processed in order to determine the respective contributions of each of the N sources ($S_i$) and the position or the orientation of the object is deduced from this, characterised in that:

the field ($H_i$) produced by each source ($S_i$) is coded using a code including a binary sequence that is specific to this source, wherein the N different codes assigned to the N different sources are two by two orthogonal, the N respective contributions of the N sources are obtained through decodings that correspond to the N codes used in the sources.

2. Method according to claim 1, in which the N codes used in the N sources are comprised of N pseudo-random binary sequences ($seq_i(t)$) two by two orthogonal, the decodings then being correlation operations.

3. Method according to claim 2, in which, in addition, sinusoidal modulation of the field is carried out in each source and in which, in the processing means, a corresponding demodulation is carried out.

4. Method according to claim 1, in which, in the sensor (20), M components of the field are measured along M different directions ($O_x$, $O_y$, $O_z$) (where M is a whole number as least equal to 1) and N decodings are carried out on each of the M components in order to obtain the N contributions of the N sources ($S_i$) to each of these M components.

5. Method according to claim 1, in which the magnetic field produced by the sources is the magnetic component of an electromagnetic field, the sources then being electromagnetic field sources.

6. Device for determining the position or the orientation of an object in space using the method according to claim 1, comprising:

a plurality of N sources ($S_i$) of magnetic field ($H_i$) (where N is a whole number at least equal to 1) in all of the space where the object is supposed to be situated, a magnetic sensor (20) equipping the object, means for processing the signal ($C_i(t)$) delivered by the sensor (20), wherein these means are suited to determining the respective contributions of each of the N sources ($S_i$) and for deducing from this the position or the orientation of the object, characterised in that is comprises in addition:

means for coding the field ($H_i$) produced by each source ($S_i$) by a code specific to this source, the N different codes assigned to the N different sources being two by two orthogonal, means for decoding the, field using N codes in order to obtain the N respective contributions of the N sources.

7. Device according to claim 6, in which the N codes used in the N sources are made up of N pseudo-random binary sequences ($seq_i(t)$) orthogonal two by two, the means of decoding then being correlation means.

8. Device according to claim 7, in which each source comprises a carrier generator (16) and in which the means of processing comprise corresponding demodulation means.

9. Device according to claim 6, in which the sensor components of the field along M different directions ($O_x$, $O_y$, $O_z$) (where M is a whole number at lease equal to 1) and in which the means of processing comprise means for carrying out N decodings on each of the M components and deliver the N contributions of the N sources ($S_i$) to each of these M components.

* * * * *